United States Patent
Nagayasu et al.

(10) Patent No.: US 8,398,758 B2
(45) Date of Patent: Mar. 19, 2013

(54) $CO_2$ RECOVERY SYSTEM AND $CO_2$ RECOVERY METHOD

(75) Inventors: Hiromitsu Nagayasu, Tokyo (JP);
Takashi Kamijo, Tokyo (JP); Takahito Yonekawa, Tokyo (JP); Hiroshi Tanaka, Tokyo (JP); Shinya Kishimoto, Tokyo (JP); Takuya Hirata, Tokyo (JP); Tatsuya Tsujiuchi, Tokyo (JP); Masaru Chiyomaru, Tokyo (JP); Koji Nakayama, Hiroshima (JP); Masahiko Tatsumi, Hyogo (JP); Yasuyuki Yagi, Hyogo (JP); Kazuhiko Kaibara, Hyogo (JP)

(73) Assignees: Mitsubishi Heavy Industries, Ltd., Tokyo (JP); The Kansai Electric Power Co., Inc., Osaka-shi, Osaka (JP)

( * ) Notice: Subject to any disclaimer, the term of this patent is extended or adjusted under 35 U.S.C. 154(b) by 275 days.

(21) Appl. No.: 12/901,051

(22) Filed: Oct. 8, 2010

(65) Prior Publication Data
US 2011/0158891 A1 Jun. 30, 2011

(30) Foreign Application Priority Data
Dec. 25, 2009 (JP) ................................. 2009-295983

(51) Int. Cl.
*B01D 53/18* (2006.01)
*B01D 53/62* (2006.01)

(52) U.S. Cl. .......................................... 96/243; 422/169

(58) Field of Classification Search .................... 96/234, 96/243, 267; 95/149, 187, 188, 193, 199, 95/206, 209, 236; 423/220, 228, 229; 422/169–171
See application file for complete search history.

(56) References Cited

U.S. PATENT DOCUMENTS

| | | | |
|---|---|---|---|
| 5,904,908 A | * | 5/1999 | Suzuki et al. ................. 423/228 |
| 6,344,130 B1 | | 2/2002 | Koike et al. |

(Continued)

FOREIGN PATENT DOCUMENTS

| | | |
|---|---|---|
| EP | 0933120 A1 | 8/1999 |
| EP | 2 335 802 A2 | 6/2011 |

(Continued)

OTHER PUBLICATIONS

Russian Office Action dated Jan. 25, 2012, issued in corresponding Russian Patent Application No. 2010144447.

(Continued)

*Primary Examiner* — Frank Lawrence, Jr.
(74) *Attorney, Agent, or Firm* — Westerman, Hattori, Daniels & Adrian, LLP

(57) ABSTRACT

A $CO_2$ recovery system includes an absorber 2 and a regenerator 3. The absorber 2 includes a $CO_2$ absorbing section 21 and a water-washing section 22. The $CO_2$ absorbing section 21 allows flue gas i01 to come into contact with a basic amine compound absorbent 103 so that the basic amine compound absorbent 103 absorbs $CO_2$ in the flue gas 101. The water-washing section 22 allows the decarbonated flue gas 101A in which the amount of $CO_2$ has been reduced in the $CO_2$ absorbing section 21 to come into contact with circulating wash water 104 and to be washed with the wash water 104 so that the amounts of the basic amine compounds entrained in the decarbonated flue gas 101A are reduced. The regenerator 3 releases $CO_2$ from the basic amine compound absorbent 103 the $CO_2$ absorbed therein.

2 Claims, 2 Drawing Sheets

U.S. PATENT DOCUMENTS

| | | | |
|---|---|---|---|
| 6,784,320 | B2 | 8/2004 | Mimura et al. |
| 7,316,737 | B2 | 1/2008 | Mimura et al. |
| 2008/0112869 | A1* | 5/2008 | MacKnight .................. 423/228 |
| 2008/0307968 | A1 | 12/2008 | Kang et al. |
| 2009/0282977 | A1 | 11/2009 | Koss |
| 2011/0041685 | A1* | 2/2011 | Tanaka et al. ..................... 95/16 |
| 2011/0308389 | A1* | 12/2011 | Graff et al. ..................... 95/166 |

FOREIGN PATENT DOCUMENTS

| | | |
|---|---|---|
| JP | 8-080421 A | 3/1996 |
| JP | 10-033938 A | 2/1998 |
| JP | 2002-126439 A | 5/2002 |
| RU | 2369428 C2 | 10/2009 |
| RU | 2389534 C2 | 5/2010 |
| WO | 2008/145658 A1 | 12/2008 |

OTHER PUBLICATIONS

Notice of Acceptance dated May 2, 2012, issued in corresponding Australian Patent Application No. 2010236041 (3 pages).

Australian Office Action dated Nov. 3, 2011, issued in corresponding Australian Patent Application No. 2010236041.

Extended European Search Report dated Oct. 17, 2012, issued in corresponding European Patent Application No. 10188103.5, (7 pages).

* cited by examiner

$CO_2$ RECOVERY SYSTEM AND $CO_2$ RECOVERY METHOD

TECHNICAL FIELD

The present invention relates to a $CO_2$ recovery system and a $CO_2$ recovery method for reducing the concentrations of residual basic amine compounds emitted together with decarbonated flue gas in which the amount of $CO_2$ has been reduced by contact with an absorbent.

BACKGROUND ART

The greenhouse effect due to $CO_2$ has been pointed out as one of the causes of global warming, and there is an urgent need to take global measures against the greenhouse effect to protect the global environment. The sources of $CO_2$ can be found in various fields of human activities in which fossil fuels are burnt, and there is an increasing tendency to tighten $CO_2$ emission regulations. Accordingly, extensive studies have been conducted on $CO_2$ recovery methods applicable to power generation facilities, such as thermal power plants, which use a large amount of fossil fuels. In these methods, flue gas from a boiler is brought into contact with an amine-based absorbent such as an aqueous solution of an amine compound to collect and recover $CO_2$ in the flue gas.

When such an absorbent is used to recover $CO_2$ from flue gas, the amine compound is entrained in the decarbonated flue gas in which the amount of $CO_2$ has been reduced. Therefore, to prevent air pollution by the amine compound, the amount of the amine compound emitted together with the decarbonated flue gas must be reduced.

PTL 1 discloses a conventional amine recovery system. This system includes a plurality of stages of water-washing units for collecting an amine compound entrained in decarbonated flue gas. In each water-washing unit stage, wash water is brought into gas-liquid contact with the decarbonated flue gas in which the amount of $CO_2$ has been reduced by gas-liquid contact with an absorbent that absorbs $CO_2$. The amine entrained in the decarbonated flue gas is collected sequentially in the plurality of stages of the water-washing units. As the wash water used in PTL 1, condensed water is used which is produced by condensing and separating water contained in $CO_2$ during a process of regenerating the amine-based absorbent by removing $CO_2$ from the $CO_2$-absorbed amine-based absorbent.

PTL 2 discloses a conventional decarbonation system including: a cooling unit for cooling decarbonated flue gas in which the amount of $CO_2$ has been reduced by gas-liquid contact with an absorbent; and a contact unit in which condensed water condensed in the cooling unit is brought into countercurrent contact with the decarbonated flue gas. PTL 2 discloses another decarbonation system that includes a water-washing unit for collecting the amine compound entrained in decarbonated flue gas by bringing wash water into gas-liquid contact with the decarbonated flue gas in which the amount of $CO_2$ has been reduced by gas-liquid contact with an absorbent. The wash water used is condensed-water condensed in a cooling tower for cooling the flue gas from which $CO_2$ has not been recovered.

CITATION LIST

Patent Literature

[PTL 1] JP 2002-126439A
[PTL 2] JP H08-80421A

SUMMARY OF INVENTION

Technical Problem

In recent years, from the viewpoint of environmental protection, there is a demand to further reduce the concentrations of residual absorbent components emitted together with decarbonated flue gas. It is expected in the future that a $CO_2$ recovery system is applied to flue gas from, for example, a thermal power plant in which the flow rate of processed gas is high. In this case, the emission amounts of residual absorbent components emitted together with the decarbonated flue gas tend to increase because the emission amount of the flue gas is high. Therefore, the concentrations of the emitted absorbent components must be further reduced.

The present invention solves the foregoing problems, and it is an object of the invention to provide a $CO_2$ recovery system and a $CO_2$ recovery method that can further reduce the concentration of residual basic amine compounds emitted together with decarbonated flue gas.

Solution to Problem

According to an aspect of the present invention, a $CO_2$ recovery system includes: an absorber including a $CO_2$ absorbing section and a water-washing section, the $CO_2$ absorbing section allowing flue gas to come into contact with a basic amine compound absorbent so that the basic amine compound absorbent absorbs $CO_2$ in the flue gas, the water-washing section allowing the decarbonated flue gas from which $CO_2$ has been absorbed in the $CO_2$ absorbing section to come into contact with circulating wash water and to be washed with the wash water so that basic amine compounds entrained in the decarbonated flue gas are reduced in amount; a regenerator releasing the $CO_2$ from the basic amine compound absorbent containing the $CO_2$ absorbed into; and a concentrating unit for concentrating the wash water from the water-washing section, the concentrating unit returning condensed water generated during concentration to the water-washing section.

In this $CO_2$ recovery system, since the condensed water generated when the wash water from the water-washing section is concentrated is returned to the water-washing section, the concentrations of the basic amine compounds in the wash water circulating in the water-washing section are reduced, and the efficiency of washing with the wash water is thereby improved. Therefore, the concentrations of the basic amine compounds in the decarbonated flue gas can be reduced, and the concentrations of the residual basic amine compounds emitted together with the decarbonated flue gas can thereby be further reduced.

Advantageously, in the $CO_2$ recovery system, the water-washing section includes a plurality of water-washing sections disposed in a path through which the decarbonated flue gas flows upward, and the concentrating unit concentrates part of the wash water discharged from an uppermost one of the plurality of water-washing sections to form a concentrated solution, the concentrated solution being delivered to a lower one of the plurality of water-washing sections, the condensed water being returned to the uppermost water-washing section.

In this $CO_2$ recovery system, since the condensed water generated when the wash water from the uppermost water-washing section is concentrated is returned to the uppermost water-washing section, the concentrations of the basic amine compounds in the wash water circulating in the uppermost water-washing section are reduced, and the efficiency of washing with the wash water in the uppermost water-washing section is thereby improved. Therefore, the concentrations of the basic amine compounds in the decarbonated flue gas can be further reduced, and the concentrations of the residual basic amine compounds discharged together with the decarbonated flue gas can thereby be further reduced.

According to another aspect of the present invention, a $CO_2$ recovery method includes the steps of: bringing flue gas into contact with a basic amine compound absorbent so that the basic amine compound absorbent absorbs $CO_2$ contained in the flue gas; washing the decarbonated flue gas in which an amount of $CO_2$ has been reduced with circulating wash water by bringing the decarbonated flue gas into contact with the wash water so that amounts of basic amine compounds entrained in the decarbonated flue gas are reduced; releasing $CO_2$ from the basic amine compound absorbent containing the $CO_2$ absorbed therein; and concentrating the wash water and delivering condensed water generated during concentration to the step of washing with the wash water.

In this $CO_2$ recovery method, the decarbonated flue gas is washed with wash water by bringing the decarbonated flue gas into contact with the wash water so that the amounts of basic amine compounds entrained in the decarbonated flue gas are reduced. The wash water used in the step of washing is concentrated, and the condensed water generated during concentration is returned to the step of washing with the wash water. In this manner, the concentrations of the basic amine compounds in the circulating wash water are reduced, and the efficiency of washing with the wash water is thereby improved. Therefore, the concentrations of the basic amine compounds in the decarbonated flue gas can be reduced, and the concentrations of the residual basic amine compounds discharged together with the decarbonated flue gas can thereby be further reduced.

Advantageously, in the $CO_2$ recovery method, the step of washing the decarbonated flue gas in which an amount of $CO_2$ has been reduced with circulating wash water by bringing the decarbonated flue gas into contact with the wash water so that amounts of basic amine compounds entrained in the decarbonated flue gas are reduced is performed at a plurality of stages in a flow path through which the decarbonated flue gas flows upward, and wherein, in the step of concentrating the wash water, the wash water from the step of washing performed at an uppermost stage is concentrated to form a concentrated solution, the concentrated solution being delivered to the step of washing performed at a lower stage in the flow path, the condensed water being returned to the step of washing performed at the uppermost stage.

In this $CO_2$ recovery method, since the condensed water generated when the wash water is concentrated is delivered to the washing step performed at the uppermost position, the concentrations of the basic amine compounds in the wash water circulated in the washing step performed at the uppermost position are reduced, and the efficiency of washing with the wash water in the washing step performed at the uppermost position is thereby improved. Therefore, the concentrations of the basic amine compounds in the decarbonated flue gas can be further reduced, and the concentrations of the residual basic amine compounds discharged together with the decarbonated flue gas can thereby be further reduced.

Advantageous Effects of Invention

According to the present invention, the concentrations of the residual basic amine compounds emitted together with the decarbonated flue gas can be further reduced.

DESCRIPTION OF EMBODIMENTS

Hereinafter, embodiments of the present invention will be described in detail with reference to the drawings. However, the present invention is not limited to the embodiments. Components in the following embodiments include those which can be easily replaced by persons skilled in the art and also include substantially equivalent components.

Figure 1:
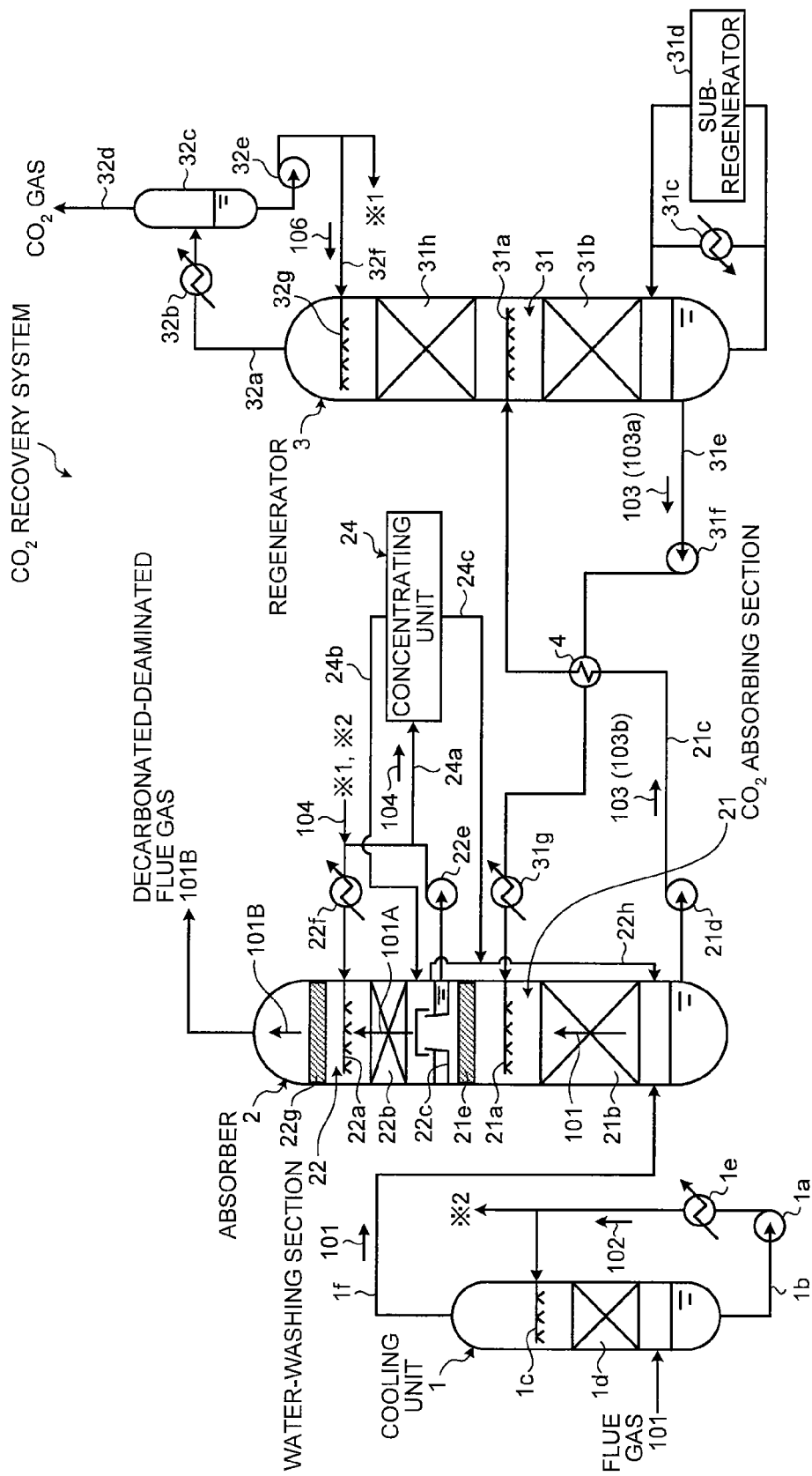
FIG. 1 is a schematic diagram of a $CO_2$ recovery system according to a first embodiment of the present invention.

A first embodiment will be described with reference to the drawings. FIG. 1 is a schematic diagram of a $CO_2$ recovery system according to the first embodiment.

As shown in FIG. 1, this $CO_2$ recovery system includes a cooling unit 1, an absorber 2, and a regenerator 3. The cooling unit 1 cools flue gas 101 discharged from an industrial facility (not shown) such as a boiler with cooling water 102. The absorber 2 allows a lean solution 103a of a basic amine compound absorbent 103, which is an aqueous solution of a basic amine compound that absorbs $CO_2$, to come into countercurrent contact with the flue gas 101 so that the basic amine compound absorbent 103 absorbs $CO_2$ in the flue gas 101. The flue gas 101 in which the amount of $CO_2$ has been reduced is discharged from the absorber 2. The regenerator 3 releases $CO_2$ from a rich solution 103b of the basic amine compound absorbent 103 that contains the $CO_2$ absorbed therein, so that the lean solution 103a is regenerated.

The flue gas 101 containing $CO_2$ is increased in pressure by a flow gas blower (not shown) and is delivered inside the cooling unit 1. In the cooling unit 1, the flue gas 101 comes into countercurrent contact with the cooling water 102 and is thereby cooled.

The cooling water 102 is accumulated in the lower portion of the cooling unit 1, and is supplied by a cooling water circulation pump 1a to the upper portion of the cooling unit 1 through a cooling water tube 1b disposed outside the cooling unit 1. Then the cooling water 102 flows downward from nozzles 1c disposed in the upper portion of the cooling unit 1 while the cooling water 102 comes into countercurrent contact with the rising flue gas 101 at the position of a packed bed 1d disposed between the nozzles 1c and the lower portion of the cooling unit 1. The cooling water tube 1b is provided with a cooling unit 1e. The cooling water 102 is thereby cooled to a temperature lower than the temperature of the flue gas 101, so that part of water in the flue gas 101 is condensed in the cooling unit 1 to form condensed water. The flue gas 101 cooled in the cooling unit 1 is discharged from the cooling unit 1 through a flue gas tube 1f and is then supplied to the absorber 2.

The absorber 2 includes a $CO_2$ absorbing section 21 disposed in the lower half thereof, a water-washing section 22 disposed in the upper half, and a concentrating unit 24 disposed outside the absorber 2. In the $CO_2$ absorbing section 21, the flue gas 101 supplied from the cooling unit 1 comes into countercurrent contact with the lean solution 103a of the basic amine compound absorbent 103, so that the basic amine compound absorbent 103 absorbs $CO_2$ in the flue gas 101.

The lean solution 103a of the basic amine compound absorbent 103 is supplied from the regenerator 3 and flows downward from nozzles 21a. After coming into countercurrent contact with the rising flue gas 101 at the position of a packed bed 21b disposed between the nozzles 21a and the lower portion of the absorber 2, the lean solution 103a becomes the rich solution 103b containing $CO_2$ absorbed therein, and the rich solution 103b is accumulated in the bottom portion of the absorber 2. The rich solution 103b of the basic amine compound absorbent 103 accumulated in the bottom portion of the absorber 2 is pumped by a rich-solution discharge pump 21d disposed in a rich-solution tube 21c disposed outside the absorber 2 and is then supplied to the regenerator 3. The decarbonated flue gas 101A in which the amount of $CO_2$ has been reduced flows upward and passes through a demister 21e, and the basic amine compound absorbent 103 in a mist form that is entrained in the decarbonated flue gas 101A is thereby collected.

The water-washing section 22 allows the decarbonated flue gas 101A in which the amount of $CO_2$ has been reduced in the $CO_2$ absorbing section 21 to come into countercurrent contact with wash water 104, so that the amounts of the basic amine compounds entrained in the decarbonated flue gas 101A are reduced through the wash water 104. The decarbonated-deaminated flue gas 101B in which the amounts of the basic amine compounds have been reduced is discharged to the outside of the $CO_2$ recovery system (the absorber 2).

The wash water 104 flows downward from nozzles 22a, while the wash water 104 comes into countercurrent contact with the rising decarbonated flue gas 101A at the position of a packed bed 22b disposed between the nozzles 22a and a water-washing section water receiver 22c. Then, the wash water 104 is accumulated in the water-washing section water receiver 22c. The wash water 104 accumulated in the water-washing section water receiver 22c is pumped and circulated by a wash water circulation pump 22e disposed in a wash water tube 22d disposed outside the absorber 2, while the wash water 104 is cooled in a cooling unit 22f, and again flows downward from the nozzles 22a. More specifically, the wash water 104 is circulated and comes into countercurrent contact with the decarbonated flue gas 101A so that the basic amine compounds in the decarbonated flue gas 101A are reduced in amount. After the basic amine compounds in the decarbonated flue gas 101A are reduced in amount through the wash water 104, the resultant decarbonated-deaminated flue gas 101B further flows upward and passes through a demister 22g, and the wash water 104 in a mist form that is entrained in the decarbonated-deaminated flue gas 101B is thereby collected. The basic amine compounds include, in addition to the basic amine compound used as absorbent, low-molecular weight basic amine compounds generated through decomposition.

In the water-washing section 22, part of condensed water (*1) generated when the $CO_2$ gas separated from the basic amine compound absorbent 103 in the regenerator 3 is cooled or part of condensed water (*2) generated when the flue gas 101 is cooled in the cooling unit 1 is supplied, as the wash water 104, to the wash water tube 22d at a position upstream of the cooling unit 22f. The wash water 104 spilled over the water-washing section water receiver 22c of the water-washing section 22 is discharged to an overflow tube 22h disposed outside the absorber 2 and is then supplied to the bottom of the $CO_2$ absorbing section 21.

The concentrating unit 24 discharges part of the wash water 104 circulating in the water-washing section 22 to the outside of the absorber 2 for concentration. The concentrating unit 24 is connected between a wash water discharge pump 22e and the cooling unit 22f disposed in the wash water tube 22d of the water-washing section 22 through a discharge tube 24a and is also connected to the water-washing section water receiver 22c of the water-washing section 22 through a return tube 24b and to the $CO_2$ absorbing section 21 (the overflow tube 22h) through a return tube 24c. The return tube 24c may be directly connected to the bottom portion of the $CO_2$ absorbing section 21.

Preferably, the concentrating unit 24 is a multiple-effect evaporator or a vapor compression condenser. The multiple-effect evaporator includes a plurality of evaporators. The wash water 104 is accumulated in a first one of the evaporators and is then heated and evaporated. The concentrated wash water 104 is supplied to the next evaporator, and the generated vapor is used as the heat source for the next evaporator.

In the vapor compression condenser, vapor generated in an evaporator is pressurized by a compressor to increase the temperature and is used as a heat source for heating. With the vapor compression condenser, the power consumption during concentration can be reduced.

In such a concentrating unit 24, the wash water 104 pumped through the discharge tube 24a by the wash water discharge pump 22e is concentrated, and the concentrated wash water 104 is returned to the $CO_2$ absorbing section 21 through the return tube 24c. Condensed water generated during concentration is delivered to the water-washing section water receiver 22c through the return tube 24b, and the concentrations of basic amines in the wash water 104 can thereby be reduced.

The regenerator 3 includes an absorbent regenerating unit 31 disposed in the lower half thereof. In the absorbent regenerating unit 31, $CO_2$ is recovered from the rich solution 103b to regenerate the basic amine compound absorbent 103 as the lean solution 103a, thereby releasing $CO_2$ from the basic amine compound absorbent 103 containing the $CO_2$ absorbed therein.

The rich solution 103b of the basic amine compound absorbent 103 is supplied from the rich-solution tube 21c of the $CO_2$ absorbing section 21 in the absorber 2 and flows downward from nozzles 31a. Then the rich solution 103b passes through a lower packed bed 31b disposed between the nozzles 31a and the lower portion of the regenerator 3 and is thereby converted to the lean solution 103a from which substantially the entire amount of $CO_2$ has been released through endothermic reaction caused by a regenerating heater 31c connected to the lower portion of the regenerator 3. The resulting lean solution 103a is accumulated in the bottom portion of the regenerator 3. A sub-regenerator 31d is connected to the lower portion of the regenerator 3. In the sub-regenerator 31d, part of the lean solution 103a is heated. Therefore, degraded products, and the like are concentrated and collected as sludge, and the generated vapor is returned to the lower portion of the regenerator 3. The lean solution 103a accumulated in the lower portion of the regenerator 3 is pumped by a lean solution discharge pump 31f disposed in a lean solution tube 31e and is supplied to the absorber 2. During this process, the lean solution 103a is heat-exchanged in a rich-lean heat exchanger 4 with the rich solution 103b supplied to the regenerator 3 through the rich-solution tube 21c and is cooled in a cooling unit 31g.

The released $CO_2$ flows upward in the regenerator 3, passes through an upper packed bed 31h, and is discharged from the top portion of the regenerator 3. Since the discharged $CO_2$ contains water, it is cooled in a condenser 32b disposed in a $CO_2$ discharge line 32a. The water contained in the $CO_2$ is thereby condensed, and the condensed water 106 is separated from $CO_2$ in a $CO_2$ separator 32c. The high-purity $CO_2$ separated from the condensed water 106 is emitted to the outside of the decarbonation system through a $CO_2$ emission line 32d and is used or disposed of in the subsequent process. The condensed water 106 is delivered by a condensed water pump 32e, and part of the condensed water 106 is supplied to the regenerator 3 from nozzles 32g disposed in the top portion of the regenerator 3 through a regenerator reflux water line 32f.

The condensed water 106 has a very low amine concentration and therefore can be used as the replenishing water for the water-washing section 22.

As described above, the $CO_2$ recovery system of the first embodiment includes the absorber 2 and the regenerator 3. The absorber 2 includes the $CO_2$ absorbing section 21 and the water-washing section 22. The $CO_2$ absorbing section 21 allows the flue gas 101 containing $CO_2$ to come into contact with the basic amine compound absorbent 103 so that the basic amine compound absorbent 103 absorbs $CO_2$ in the flue gas 101. The water-washing section 22 allows the decarbonated flue gas 101A in which the amount of $CO_2$ has been reduced in the $CO_2$ absorbing section 21 to come into contact with the circulating wash water 104 and to be washed with the wash water 104 so that the amounts of the basic amine compounds entrained in the decarbonated flue gas 101A are reduced. The regenerator 3 release the $CO_2$ from the basic amine compound absorbent 103 containing the $CO_2$ absorbed in. The $CO_2$ recovery system further includes the concentrating unit 24 for concentrating the wash water 104 discharged from the water-washing section 22. The concentrated solution is delivered to the $CO_2$ absorbing section 21, and the condensed water generated during concentration is returned to the water-washing section 22.

In this $CO_2$ recovery system, since the wash water 104 from the water-washing section 22 is concentrated and the condensed water is returned to the water-washing section 22, the concentrations of the basic amine compounds in the wash water 104 circulating in the water-washing section 22 are reduced by a factor of about 10, and the efficiency of washing with the wash water 104 is thereby improved. Therefore, the concentrations of the basic amine compounds in the decarbonated flue gas 101A can be reduced by a factor of about 10, and the concentrations of the residual basic amine compounds discharged together with the decarbonated-deaminated flue gas 101B can be further reduced.

A $CO_2$ recovery method of the first embodiment includes the steps of: bringing the flue gas 101 containing $CO_2$ into contact with the basic amine compound absorbent 103 to reduce the amount of $CO_2$ contained in the flue gas 101; washing the decarbonated flue gas 101A in which the amount of $CO_2$ has been reduced with the circulating wash water 104 by bringing the decarbonated flue gas 101A into contact with the wash water 104 so that the amounts of the basic amine compounds entrained in the decarbonated flue gas 101A are reduced; and releasing $CO_2$ from the basic amine compound absorbent 103 that has absorbed the $CO_2$. The $CO_2$ recovery method further includes the step of concentrating the wash water 104 used in the step of washing with the wash water 104 to form a concentrated solution, and delivering the concentrated solution to the $CO_2$ absorbing step, and returning the condensed water generated during concentration to the step of washing with the wash water 104.

In this $CO_2$ recovery method, the decarbonated flue gas 101A in which the amount of $CO_2$ has been reduced is brought into contact with the wash water 104 to reduce the amounts of the basic amine compounds entrained in the decarbonated flue gas 101A, and the wash water 104 used in this step of reducing the amounts of the basic amine compounds is concentrated. The concentrated solution is delivered to the $CO_2$ absorbing step, and the condensed water is returned to the step of washing with the wash water. In this manner, the concentrations of the basic amine compounds in the wash water 104 are reduced by a factor of about 10, and the efficiency of washing with the wash water 104 is thereby improved. Therefore, the concentrations of the basic amine compounds in the decarbonated flue gas 101A can be reduced by a factor of about 10, and the concentrations of the residual basic amine compounds discharged together with the decarbonated-deaminated flue gas 101B can be further reduced.

Second Embodiment

Figure 2:
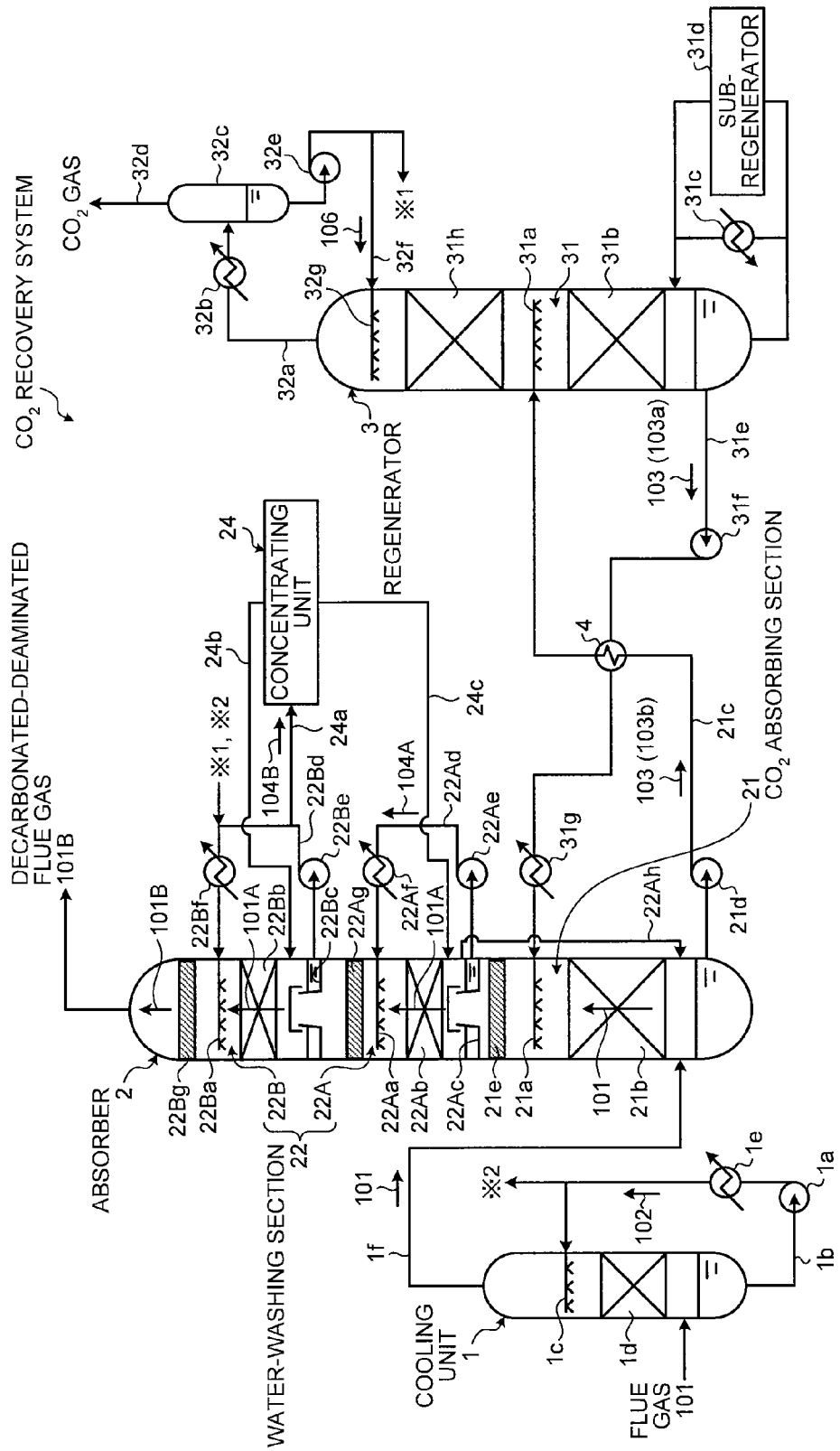
FIG. 2 is a schematic diagram of a $CO_2$ recovery system according to a second embodiment of the present invention.

A second embodiment will be described with reference to the drawing. FIG. 2 is a schematic diagram of a $CO_2$ recovery system according to embodiment 2.

As shown in FIG. 2, the $CO_2$ recovery system of the second embodiment includes, in addition to the components in the first embodiment described above, a water-washing section 22 including a plurality of sections disposed in a path through which the flue gas (decarbonated flue gas) 101 flows upward. The concentrating unit 24 is configured such that wash water 104B from an uppermost second water-washing section 22B is concentrated. The concentrated solution is delivered to a lower first water-washing section 22A, and the condensed water generated during concentration is returned to the uppermost second water-washing section 22B. The other components of the $CO_2$ recovery system of the second embodiment are the same as those of the $CO_2$ recovery system of the first embodiment. Therefore, the same components are designated by the same reference numerals, and their description will be omitted.

In the present embodiment, the water-washing section 22 includes the first water-washing section 22A and the second water-washing section 22B that are disposed in the path through which the decarbonated flue gas 101A flows upward. The lower first water-washing section 22A allows the decarbonated flue gas 101A in which the amount of $CO_2$ has been reduced in the $CO_2$ absorbing section 21 to come into countercurrent contact with wash water 104A, so that the amounts of the basic amine compounds entrained in the decarbonated flue gas 101A are reduced through the wash water 104A.

The wash water 104A flows downward form nozzles 22Aa, while the wash water 104A comes into countercurrent contact with the rising decarbonated flue gas 101A at the position of a packed bed 22Ab disposed between the nozzles 22Aa and a water-washing section water receiver 22Ac. Then, the wash water 104A is accumulated in the water-washing section water receiver 22Ac. The wash water 104A accumulated in the water-washing section water receiver 22Ac is pumped and circulated by a wash water discharge pump 22Ae disposed in a wash water tube 22Ad disposed outside the absorber 2, while the wash water 104A cooled in a cooling unit 22Af, and again flows downward from the nozzles 22Aa. More specifically, the wash water 104A is circulated and comes into countercurrent contact with the decarbonated flue gas 101A so that the basic amine compounds in the decarbonated flue gas 101A are reduced in amount. After the basic amine compounds are reduced in amount through the wash water 104A, the resultant decarbonated flue gas 101A further flows upward and passes through a demister 22Ag, and the wash water 104A in a mist form that is entrained in the decarbonated flue gas 101A is thereby collected.

The upper second water-washing section 22B allows the rising decarbonated flue gas 101A that has passed through the first water-washing section 22A to come into countercurrent contact with wash water 104B so that the basic amine compounds entrained in the decarbonated flue gas 101A are further reduced in amount through the wash water 104B. The resultant decarbonated-deaminated flue gas 101B in which the amounts of the basic amine compounds has been reduced is discharged to the outside of the $CO_2$ recovery system (the absorber 2).

The wash water 104B flows downward from nozzles 22Ba, while the wash water 104B comes into countercurrent contact with the rising decarbonated flue gas 101A at the position of a packed bed 22Bb disposed between the nozzles 22Ba and a water-washing section water receiver 22Bc. Then, the wash water 104B is accumulated in the water-washing section water receiver 22Bc. The wash water 104B accumulated in the water-washing section water receiver 22Bc is pumped and circulated by a wash water circulation pump 22Be disposed in a wash water tube 22Bd disposed outside the absorber 2, while the wash water 104B is cooled by a cooling unit 22Bf, and again flows downward from the nozzles 22Ba. More specifically, the wash water 104B is circulated and comes into countercurrent contact with the decarbonated flue gas 101A so that the basic amine compounds in the decarbonated flue gas 101A are reduced in amount. After the basic amine compounds are reduced in amount through the wash water 104B, the resultant decarbonated-deaminated flue gas 101B further flows upward and passes through a demister 22Bg, and the wash water 104B in a mist form that is entrained in the decarbonated-deaminated flue gas 101B is thereby collected.

In the second water-washing section 22B, part of condensed water (*1) generated when the $CO_2$ gas separated from the basic amine compound absorbent 103 in the regenerator 3 is cooled or part of condensed water (*2) generated when the flue gas 101 is cooled in the cooling unit 1 is supplied, as the wash water 104B, to the wash water tube 22Bd at a position upstream of the cooling unit 22Bf. The wash water 104B spilled over the water-washing section water receiver 22Bc of the second water-washing section 22B is discharged to an overflow tube 22Bh disposed outside the absorber 2 and then supplied to the water-washing section water receiver 22Ac of the first water-washing section 22A. The wash water 104A spilled over the water-washing section water receiver 22Ac of the first water-washing section 22A is discharged to an overflow tube 22Ah disposed outside the absorber 2 and then supplied to the bottom of the $CO_2$ absorbing section 21. The water-washing section 22 may include two or more sections.

In the concentrating unit 24, part of the wash water 104B circulating in the uppermost second water-washing section 22B is discharged from the absorber 2 and then concentrated. The concentrating unit 24 is connected between the wash water circulation pump 22Be and the cooling unit 22Bf disposed in the wash water tube 22Bd of the second water-washing section 22B through the discharge tube 24a and is also connected to the water-washing section water receiver 22Bc of the second water-washing section 22B through the return tube 24 and to the water-washing section water receiver 22Ac of the first water-washing section 22A through the return tube 24c.

Preferably, the concentrating unit 24 is a multiple-effect evaporator or a vapor compression condenser. The multiple-effect evaporator includes a plurality of evaporators. The wash water 104B is accumulated in a first one of the evaporators and is then heated and evaporated. The concentrated wash water 104B is supplied to the next evaporator, and the generated vapor is used as the heat source for the next evaporator.

In the vapor compression condenser, vapor generated in an evaporator is pressurized by a compressor to increase the temperature and is used as a heat source for heating. With the vapor compression condenser, the power consumption during concentration can be reduced.

In such a concentrating unit 24, the wash water 104B supplied through the discharge tube 24a by the wash water discharge pump 22Be is concentrated. The concentrated solution is delivered to the first water-washing section 22A through the return tube 24c, and the condensed water is returned to the second water-washing section 22B through the return tube 24b.

As described above, in the $CO_2$ recovery system of the second embodiment, the water-washing section 22 includes a plurality of sections disposed in the path through which the decarbonated flue gas 101A flows upward. In the concentrating unit 24, part of the wash water 104B discharged from the uppermost second water-washing section 22B is concentrated. The concentrated solution is delivered through the return tube 24c to the first water-washing section 22A disposed on the upstream side of the flow of the decarbonated flue gas 101A, and the condensed water is returned to the uppermost second water-washing section 22B through the return tube 24b.

In this $CO_2$ recovery system, the wash water 104B used in the uppermost second water-washing section 22B is concentrated, and the condensed water is returned to the second water-washing section 22B through the return tube 24b. In this manner, the concentrations of the basic amine compounds in the wash water 104B circulating in the second water-washing section 22B are reduced, and the efficiency of washing in the second water-washing section 22B is thereby improved. Therefore, the concentrations of the basic amine compounds in the decarbonated flue gas 101A can be further reduced, and the concentrations of the residual basic amine compounds emitted together with the decarbonated-deaminated flue gas 101B can be further reduced. Since the concentrated solution is delivered to the first water-washing section 22A through the return tube 24c, the flow rate of water discharged from the first water-washing section 22A is increased. Therefore, the concentrations of the basic amine compounds in the circulation water in the first water-washing section 22A are reduced, and the concentrations of the basic amine compounds in the decarbonated flue gas supplied to the second water-washing section 22B are reduced. The concentrated solution may be returned to the $CO_2$ absorbing section 21. This is also effective to reduce the concentrations of the basic amine compounds in the decarbonated flue gas.

In a $CO_2$ recovery method of the second embodiment, the step of washing the decarbonated flue gas 101A in which the amount of $CO_2$ has been reduced with the wash water 104 by bringing the decarbonated flue gas 101A into contact with the wash water 104 so that the amounts of the basic amine compounds entrained in the decarbonated flue gas 101A are reduced is performed at a plurality of positions in the path through which the decarbonated flue gas 101A flows upward. In the step of concentrating the wash water 104, the wash water 104B from the water washing step performed at the uppermost position (the second water-washing section 22B) is concentrated. The concentrated solution is delivered to the water washing step performed at a lower position (the first water-washing section 22A disposed on the upstream side of the flow of the decarbonated flue gas 101A), and the condensed water is returned to the water washing step performed at the uppermost position (the second water-washing section 22B). The recovery method of the present embodiment includes this step.

In this $CO_2$ recovery method, since the condensed water is returned to the water washing step performed at the uppermost position, the concentrations of the basic amine compounds in the wash water 104 circulated in the water washing step performed at the uppermost position are reduced, and the washing efficiency of the water washing step performed at the uppermost position is improved. Therefore, the concentrations of the basic amine compounds in the decarbonated flue gas 101A can be further reduced, and the concentrations of the residual basic amine compounds discharged together with the decarbonated-deaminated flue gas 101B can be further reduced.

INDUSTRIAL APPLICABILITY

As described above, the $CO_2$ recovery system and method according to the present invention are suitable for further reducing the concentrations of the basic amine compounds remaining in the decarbonated flue gas.

REFERENCE SIGNS LIST 1 cooling unit.
2 absorber.
21 $CO_2$ absorbing section.
22 water-washing section.
22a nozzle.
22b packed bed.
22c water-washing section water receiver.
22d wash water tube.
22e wash water discharge pump.
22f cooling unit.
22g demister.
22h overflow tube.
22A first water-washing section.
22Aa nozzle.
22Ab packed bed.
22Ac water-washing section water receiver.
22Ad wash water tube.
22Ae wash water discharge pump.
22Af cooling unit.
22Ag demister.
22Ab overflow tube.
22B second water-washing section.
22Ba nozzle.
22Bb packed bed.
22Bc water-washing section water receiver.
22Bd wash water tube.
22Be wash water discharge pump.
22Bf cooling unit.
22Bg demister.
22Bb overflow tube.
24 concentrating unit.
24a discharge tube.
24b return tube.
24c return tube.
3 regenerator.
4 rich-lean heat exchanger.
101 flue gas.
101A decarbonated flue gas.
101B decarbonated-deaminated flue gas.
102 cooling water.
103 basic amine compound absorbent.
103a lean solution.
103b rich solution.
104 (104A, 104B) wash water.

The invention claimed is:

1. A $CO_2$ recovery system comprising:
an absorber including a $CO_2$ absorbing section and a water-washing section, the $CO_2$ absorbing section allowing flue gas to come into contact with a basic amine compound absorbent so that the basic amine compound absorbent absorbs $CO_2$ in the flue gas, the water-washing section allowing the decarbonated flue gas from which $CO_2$ has been absorbed in the $CO_2$ absorbing section to come into contact with circulating wash water and to be washed with the wash water so that basic amine compounds entrained in the decarbonated flue gas are reduced in amount;
a regenerator releasing the $CO_2$ from the basic amine compound absorbent containing the $CO_2$ absorbed into; and
a concentrating unit for concentrating the wash water from the water-washing section, the concentrating unit returning condensed water generated during concentration to the water-washing section.

2. The $CO_2$ recovery system of claim 1, wherein the water-washing section comprises a plurality of water-washing sections disposed in a path through which the decarbonated flue gas flows upward, and wherein the concentrating unit concentrates part of the wash water discharged from an uppermost one of the plurality of water-washing sections to form a concentrated solution, the concentrated solution being delivered to a lower one of the plurality of water-washing sections, the condensed water being returned to the uppermost water-washing section.

* * * * *